(12) United States Patent
Walker et al.

(10) Patent No.: US 7,006,578 B2
(45) Date of Patent: Feb. 28, 2006

(54) CONSTELLATION MAPPING FOR MODULATED COMMUNICATIONS

(75) Inventors: Christopher W. Walker, Stevenson Ranch, CA (US); Holly C. Osborne, Redondo Beach, CA (US)

(73) Assignee: Northrop Grumman Corporation, Los Angeles, CA (US)

(*) Notice: Subject to any disclaimer, the term of this patent is extended or adjusted under 35 U.S.C. 154(b) by 792 days.

(21) Appl. No.: 10/000,650

(22) Filed: Oct. 23, 2001

(65) Prior Publication Data

US 2003/0076889 A1    Apr. 24, 2003

(51) Int. Cl.
*H04L 23/02* (2006.01)
(52) U.S. Cl. ............... 375/261; 375/265; 375/298; 375/302; 375/340
(58) Field of Classification Search ............... 375/261, 375/289, 219, 265, 300, 302, 340; 714/795
See application file for complete search history.

(56) References Cited

U.S. PATENT DOCUMENTS

| | | | | |
|---|---|---|---|---|
| 4,809,277 A | * | 2/1989 | Yano | 714/795 |
| 5,828,695 A | * | 10/1998 | Webb | 375/219 |
| 6,005,897 A | * | 12/1999 | McCallister et al. | 375/340 |
| 2003/0002593 A1 | * | 1/2003 | Galins | 375/298 |

* cited by examiner

*Primary Examiner*—Shuwang Liu
(74) *Attorney, Agent, or Firm*—Patti & Brill, LLC

(57) ABSTRACT

Constellations (22) arranged in a concentric circle pattern provide simplified control of modulated communication. A plurality of concentric circles (26, 28, 30) with defined points (24) include convolutionally coded and uncoded bits. Constellation patterns having three or four concentric circles (26, 28, 30) are provided. A magnitude error for each of the points (24) allows for deviations during communication. The constellations (22) provide efficient communication using non-linear channels.

17 Claims, 2 Drawing Sheets

CONSTELLATION MAPPING FOR MODULATED COMMUNICATIONS

BACKGROUND OF THE INVENTION

1. Field of the Invention

The present invention relates generally to data transmission systems, and more particularly to transmitting data via a modulated signal based upon a signal constellation pattern.

2. Discussion of the Related Art

The increased use of electronic devices (e.g., cellular telephones, modems, etc.) for every day communication has resulted in less available bandwidth and limited frequency allocation for use in these communications. Maximizing use of the allocated bandwidth (i.e., assigned frequencies) is increasingly critical. Specifically, bandwidth modulations that can achieve efficiencies of several bits per second/hertz (bps/Hz) are desirable.

The use of modulated signals to transmit (e.g., broadcast) digital data over analog channels is common. Essentially, digital data is transmitted using a radio-frequency (RF) carrier signal that is modulated (i.e., varied). Various types of modulation schemes are currently used including, for example, amplitude modulation (AM), phase modulation, frequency modulation and pulse modulation, or a combination thereof. Each of these different modulation types is particularly adapted for different applications and has specific inefficiencies that are inherent when modulating signals.

In order to increase the amount of modulated data transmitted, various methods have been developed to pack more data into transmitted carrier waves. For example, quadrature amplitude modulation (QAM) combines two AM signals into a single channel (i.e., modulation of two orthogonal signals in the same carrier signal), which results in doubling the effective bandwidth. QAM provides both amplitude and phase modulation, and is particularly useful for wireless applications, as well as for broadband and modem communication. QAM allows multiple bits to be encoded into a single time interval commonly designated as a symbol period. QAM also allows for both signal amplitude and phase to carry data (i.e., I and Q data carriers). Various forms of QAM are known, including, for example, quadrature phase shift keying (QPSK) and M-ary QAM, which provides multilevel modulation.

With respect specifically to QAM, different transmission schemes exist that are defined by signal constellations having different numbers of code or transmission points per symbol to be transmitted (e.g., 64-QAM and 16-QAM). For example, in 16-QAM, sixteen code or transmission points are available for symbol selection. Essentially, designations such as 16-QAM refer to the size of the signal constellation used to transmit data. The signal constellation provides a plot of all possible QAM signal points with the number of n-bit symbols mapped in a two-axis plane. The constellation diagram shows the possible states for transmission wherein signal constellation diagram shows the possible states for transmission wherein signal amplitude is defined by the distance from the center of the constellation pattern to a point representing a particular state, and the angle created by a straight line connecting the center of the constellation pattern to the point representing the particular state defines the phase angle of the signal.

QAM constellation size (i.e., the number of points in the QAM constellation) is determined as follows: 2 raised to the power of the number of bits per symbol. For example, 16-QAM, which can also be identified as QAM-16, has four bits per symbol (i.e., $2^4$) and 64-QAM or QAM-64 has six bits per symbol (i.e., $2^6$). Thus, using QAM, multiple bits are packed into a single symbol period, such that the value of a symbol consisting of multiple bits is represented by the amplitude and phase states of the carrier wave.

Increasing the efficiency of bandwidth communication is desirable in many applications. One method, for example, is to use non-linear amplifiers which are inherently more power efficient at creating RF energy from direct current (DC) energy. However, achieving a high communication efficiency through a peak-power limited non-linear channel often requires complex controls. The problem encountered is that the use of non-linear channels creates distortions, which makes it difficult (i.e., complex control required) to use known signal constellation patterns, such as M-ary Quadrature Amplitude Modulation (QAM) constellations for transmissions. These known signal constellations are typically arranged in a rectangular pattern.

In particular, the use of non-linear channels causes these known rectangular constellations to rotate and expand in a manner proportional to the distance rectangular. This warping of the constellation results in a greater number of transmission errors because of control problems. Most known methods for compensating for this expansion and rotation are complex, and often inadequate to ensure acceptable transmission reliability levels for specific applications.

What is needed is a transmission scheme requiring less complex control that provides more efficient data communication using modulated signals. In particular, a constellation that retains its basic shape when transmitted over non-linear channels is desirable.

SUMMARY OF THE INVENTION

In accordance with the teachings of the present invention, a system and method for transmitting data more efficiently using modulated signals is provided that requires less complex controls. Generally, a communication or transmission scheme of the present invention for transmitting modulated signals is defined by a signal constellation arranged in a pattern having a plurality of concentric circles. Bit assignments are selected to provide a constellation that allows for simple amplitude pre-distortion with a high level of transmission efficiency (i.e., about 5 bps/Hz). The use of concentric circle constellations allows for more simple control of the amount of expansion, because the expansion in each circle will be the same through the nonlinearity. In addition, the circular constellations use less settings (i.e., less amplitude levels) than typical constellations that are maximized for linear channels using a rectangular constellation. For example, a typical 64-ary rectangular constellation requires ten discrete amplitude levels.

A constellation pattern having three concentric circles according to the present invention requires only three amplitude settings (i.e., levels), and a constellation pattern having four concentric circles according to the present invention requires only four amplitude settings (i.e., levels). Thus, the present invention is particularly well suited for applications having power and bandwidth constraints (e.g., satellite downlinks).

A transmission scheme for transmitting modulated signals according to the present invention also separates or divides data into symbols of pre-determined bit size, with two of the bits used for symbol selection produced from a convolutional encoding scheme. The constellation points for the concentric circle pattern are selected such that the error in magnitude does not exceed a predetermined level for the particular application.

Thus, the present invention provides an improved system and method for transmitting modulated signals with less complex control, which may be implemented in, for example, non-linear applications, using a constellation pattern having a plurality of concentric circles.

Additional objects, advantages and features of the present invention will become apparent from the following description and appended claims, taken in conjunction with the accompanying drawings.

DETAILED DESCRIPTION OF THE EMBODIMENTS

Figure 1:
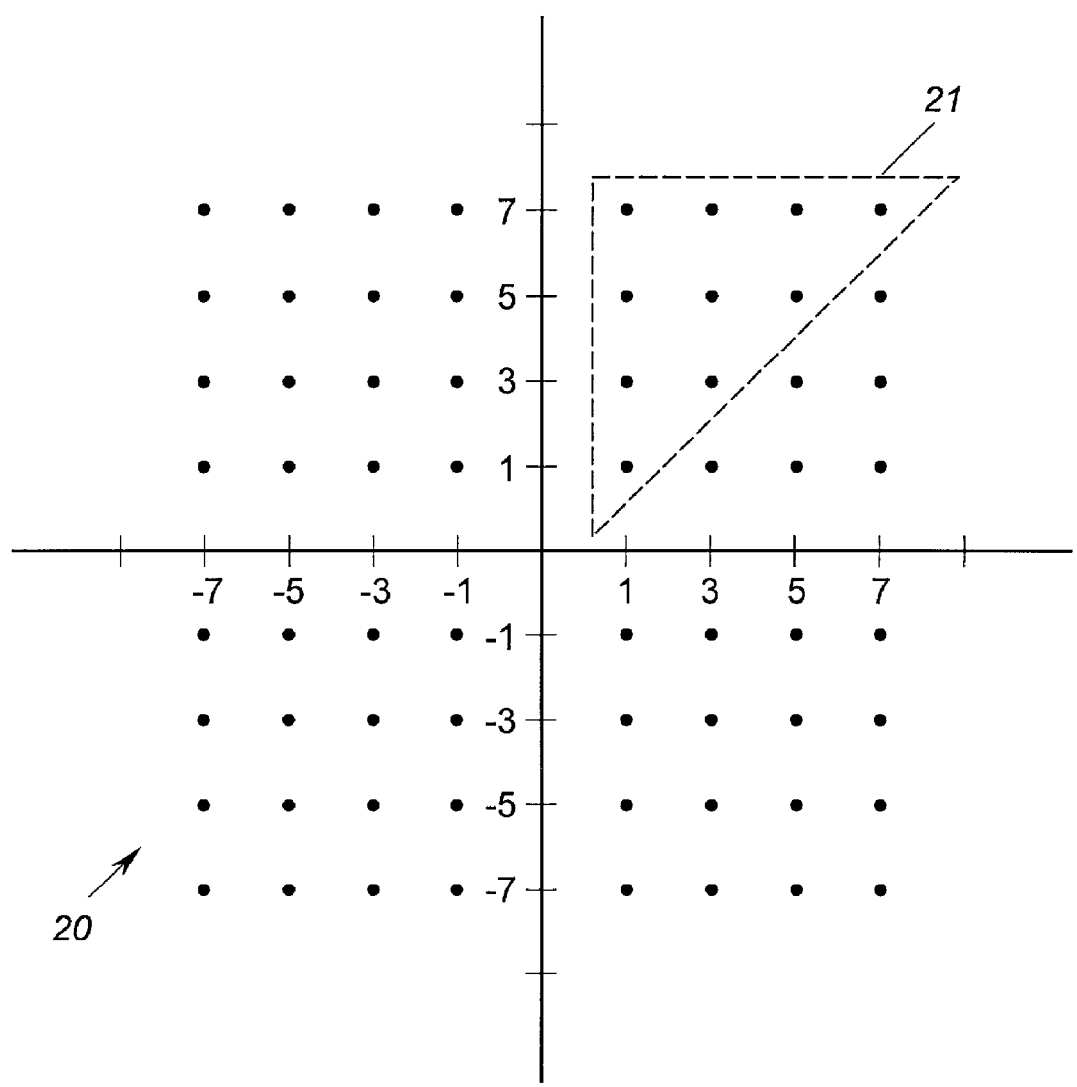
FIG. 1 is a constellation diagram showing a typical rectangular pattern for use in a 64-QAM transmission.

A typical constellation pattern used when transmitting a modulated signal requires numerous settings (i.e., for each of the amplitude levels). For example, and as shown in FIG. 1, a constellation 20 for use in a 64-ary QAM transmission requires ten amplitude levels to define the rectangular (i.e., in the form of a square) constellation 20 pattern, indicated therein by region 21. These constellation 20 patterns are typically only suitable for use in linear channel applications. In non-linear applications, signal distortion exceeds acceptable limits if not precisely controlled, which is often difficult to attain.

The following discussion of the preferred embodiments is directed to a constellation pattern allowing modulated signals to achieve bandwidth efficiencies of several bps/Hz (i.e., about 5 bps/Hz). Further, the present invention provides reliable and simple control of modulated transmissions in non-linear channel applications.

Figure 2:
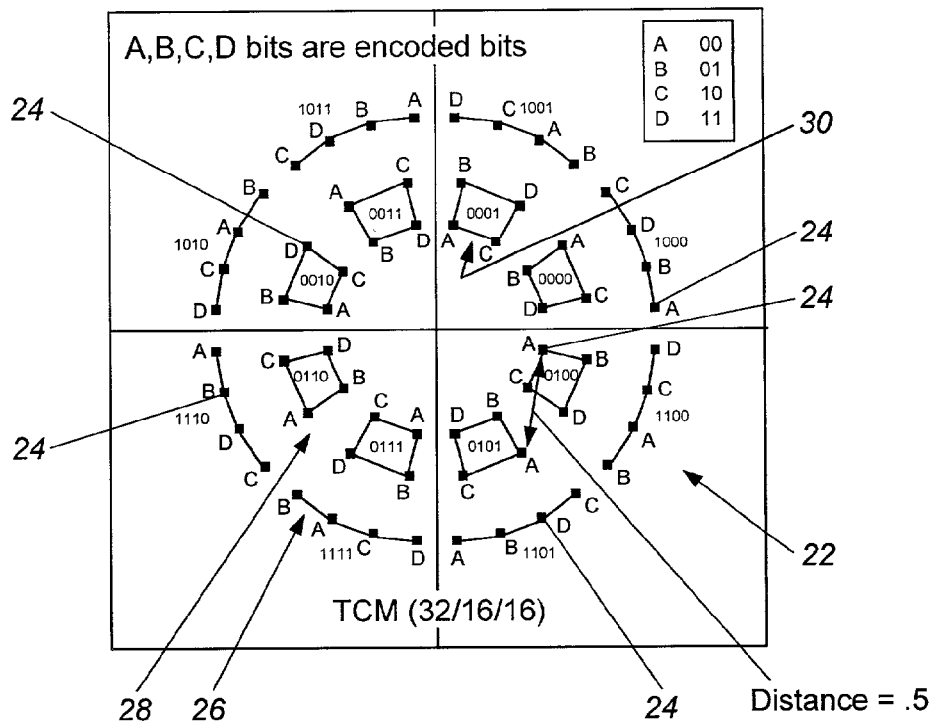
FIG. 2 is a constellation diagram showing a concentric circle pattern constructed according to the principles of the present invention.
Figure 3:
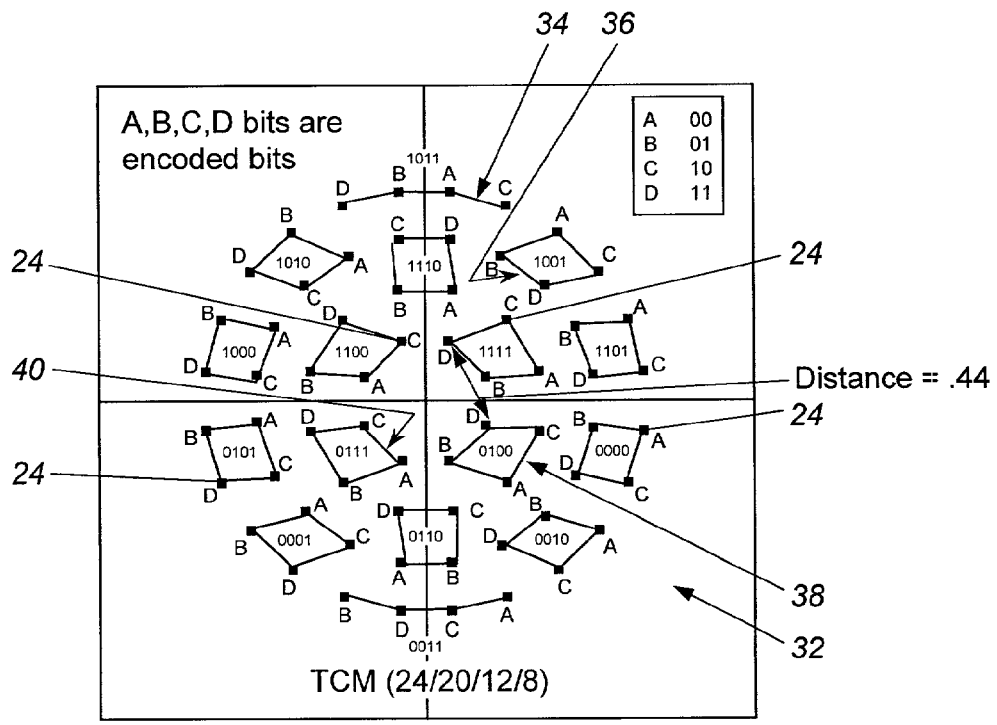
FIG. 3 is a constellation diagram showing another concentric circle pattern of the present invention.

Specifically, and as shown in FIGS. 2 and 3, constellations constructed according to the principles of the present invention include a plurality of concentric circles. Referring specifically to FIG. 2, and one embodiment of the present invention, an exemplary constellation 22 is arranged in a concentric circle pattern defined by a plurality of points 24. As shown therein for use in a 64-ary QAM (i.e., 64-QAM) transmission, three concentric circles are provided and defined by sixty-four points 24. In particular, an outer circle 26, a middle circle 28 and an inner circle 30 are each provided and define three amplitude levels for use in modulated transmissions. Specifically, the constellation 22 is preferably defined as follows:

Outer circle 24 with thirty-two points 24 and having a radius=1.0;
Middle circle 26 with sixteen points 24 and having a radius=0.7;
Inner circle 28 with sixteen points 24 and having a radius=0.5.

Referring now to FIG. 3, and another embodiment of the present invention, an exemplary constellation 32 includes a plurality of points 24 defining a concentric circle pattern having four concentric circles. As shown therein for use in a 64-ary QAM (i.e., 64-QAM) transmission, sixty-four points 24 define the four concentric circles. In particular, an outer circle 34, a first middle circle 36, a second middle circle 38 and an inner circle 40 are each provided and define four amplitude levels for use in modulated transmissions. Specifically, the constellation 32 is preferably defined as follows:

Outer circle 34 with twenty-four points 24 and having a radius=1.0;
First middle circle 36 with twenty points 24 and having a radius=0.77;
Second middle circle 38 with twelve points 24 and having a radius=0.54; and
Inner circle 40 with eight points 24 and having a radius=0.31.

To improve bit error probability, it is desired to maximize the minimum distance between uncoded bits and between coded bits of the same designation (i.e., A, B, C, D). The operating point of the system, (i.e., the power level used for transmission), determines which ring constellation as, between 3-ring and 4-ring, has the best performance. Also, for best efficiency, it is desirable to minimize the peak/average power ratio. The chart below compares the minimum distances and peak/average power ratio for both a 3-ring and 4-ring constellation of the present invention. For lower operating points, i.e., power levels, it is desirable to maximize the minimum distance between constellation points for best performance. The 4-ring constellation is preferred in this case. For higher operating points, it is desirable to maximize the minimum distance between points of the same designation for best performance. The 3-ring constellation is preferred in this case.

| Modulation | Peak Power/ Average Power | Min distance between constellation points | Min distance between points of same designation |
| --- | --- | --- | --- |
| 64-ary 3 ring | 1.6 dB | .196 | .50 |
| 64-ary 4 ring | 2.0 dB | .230 | .44 |

In operation, the constellations 22, 32 allow for modulated signal communication, for example, in non-linear channel modulated communication, with control of only three or four settings (i.e., amplitude levels). Various embodiments for encoding the bits representing the points 24 are provided depending upon the particular application. For example, and for use with constellations 22, 32, as shown in FIGS. 2 and 3, data to be modulated is separated or divided into sequences of 5 information bits (i.e., portions). Then, one of the bits is convolutionally encoded into two bits using a predetermined rate (e.g., a ½ convolutional code rate). Thus, the two coded bits and four uncoded bits define each of the 64-ary points 24.

In another exemplary embodiment for encoding, data to be modulated is separated or divided into sequences of 11 information bits (i.e., portions). In this embodiment, three of the bits are preferably convolutionally encoded into four bits using a ¾ convolutional code rate. Two of the coded bits and four of the uncoded bits determine one 64-ary constellation point 24 and the other two coded bits and other four uncoded bits determine another 64-ary constellation point 24.

The constellations 22, 32 shown in FIGS. 2 and 3 define two possible concentric circle patterns for use in modulated transmissions according to the present invention. As shown therein, the four bits indicated in the various regions of the constellations 22, 32 represent the uncoded bits, with the coded bits represented by the letters A, B, C and D, and are preferably defined as follows:

A=00
B=01
C=10
D=11

Thus, the constellations 22, 32 provide control of modulated (e.g., QAM) communications using coded bits and a lower number of amplitude levels, which results in simplified transmissions (i.e., simpler pre-distortion than rectangular and other 64-QAM constellations). Thus, the constellations 22, 32 of the present invention use peak-power more efficiently, and are particularly useful in non-linear channel applications.

Although the present invention has been described in connection with constellations having specific points defining concentric circles for use with a specific type of modulated transmission, it should be appreciated that the constellations, including the specific defined points, may be modified to provide other types of encoded and modulated signals requiring different amplitude levels. Further, variations to the configuration of the concentric circle patterns of the constellations is possible depending upon the particular transmission requirements.

The foregoing discussion discloses and describes merely exemplary embodiments of the present invention. One skilled in the art will readily recognize from such discussion and from the accompanying drawings and claims, that various changes, modifications and variations can be made therein without departing from the spirit and scope of the invention as defined in the following claims.

What is claimed is:

1. A method of transmitting data using a modulated signal, the method comprising:
   using a signal constellation arranged in first, second and third concentric circles to represent the data for transmitting the modulated signal, where the second circle has a greater diameter than the first circle and the third circle has a greater diameter than the second circle;
   arranging a number X of signal points along each of the first and second circles where X is an even number;
   arranging a number Y of signal points along the third circle where Y is twice X;
   grouping all of the signal points on the first and second circles into first sets of four where each of the first sets includes two adjacent signal points from each of the first and second circles;
   grouping all of the signal points on the third circle into second sets of four where each of the second sets includes four adjacent signal points and;
   each of the first and second sets adapted to represent a two bit binary number based on which signal point of the four signal points in each set is transmitted.

2. The method according to claim 1 wherein X is 16 and Y is 32.

3. The method according to claim 2 where the third circle radius is about 1.0, the second circle radius is about 0.7 and the first circle radius is about 0.5.

4. The method according to claim 1 further comprising using quadrature amplitude modulation for modulating the signal.

5. The method according to claim 1 further comprising separating the data into a plurality of predetermined sequence of information bits.

6. The method according to claim 5 further comprising encoding at least one of the bits of each of the predetermined sequence of information bits.

7. The method according to claim 6 wherein encoding comprises convolutionally encoding at least one bit.

8. The method according to claim 7 wherein the convolutional encoding is provided at a predetermined rate.

9. The method according to claim 1 wherein the constellation is a 64-ary constellation.

10. The method according to claim 1 further comprising transmitting data using a non-linear channel.

11. A method of transmitting data using a modulated signal, the method comprising:
    using a signal constellation arranged in first, second, third and fourth concentric circles to represent the data for transmitting the modulated signal, where the second circle has a greater diameter than the first circle and the third circle has a greater diameter than the second circle and the fourth circle has a diameter greater than the third circle;
    arranging a number W of signal points alone the first circle where W is an even number;
    arranging a number X of signal points along the second circle where X is an even number greater than W;
    arranging a number Y of signal points along the third circle where Y is an even number greater than X;
    arranging a number Z of signal points along the fourth circle where Z is an even number greater than Y;
    grouping all of the signal points on the first circle and some of the signal points on the second circle into first sets of four signal points where each of the first sets includes two adjacent signal points from each of the first and second circles;
    grouping some of the signal points on the second circle and some of the signal points on the third circle into second sets of four signal points where each of the second sets includes two adjacent signal points from each of the second and third circles;
    grouping some of the signal points on the third circle and some of the signal points on the fourth circle into third sets of four signal points where each of the third sets includes two adjacent signal points from each of the third and fourth circles;
    grouping some of the signal points on the fourth circle into fourth sets of four signal points where each of the fourth sets includes four adjacent signal points on the fourth circle;
    each of the sets adapted to represent a two bit binary number based on which signal point of the four signal points in each set is transmitted.

12. The method according to claim 11 wherein the fourth circle has twenty-four points, the third circle has twenty points, the second circle has twelve points and the first circle has eight points.

13. The method according to claim 12 where the fourth circle radius is about 1.0, the third circle radius is about 0.77, the second circle radius is about 0.54 and the first circle radius is about 0.31.

14. A method of transmitting a modulated signal, the transmission signal defined by a constellation pattern, the method comprising:
    configuring the transmission signal based upon a signal constellation arranged in first, second and third concentric circles to represent the data for transmitting the modulated signal, where the second circle has a greater diameter than the first circle and the third circle has a greater diameter than the second circle;
    arranging a number X of signal points along each of the first and second circles where X is an even number;

arranging a number Y of signal points along the third circle where Y is twice X;

grouping all of the signal points on the first and second circles into first sets of four signal points where each of the first sets includes two adjacent signal points from each of the first and second circles;

grouping all of the signal points on the third circle into second sets of four signal points where each of the second sets includes four adjacent signal points; and each of the first and second sets adapted to represent a two bit binary number based on which signal point of the four signal points in each set is transmitted.

15. The method according to claim 14 wherein the signal constellation is a 64-ary constellation.

16. A method of transmitting a modulated signal, the transmission signal defined by a constellation pattern, the method comprising:

configuring the transmission signal based upon a signal constellation arranged in first, second, third and fourth concentric circles to represent the data for transmitting the modulated signal, where the second circle has a greater diameter than the first circle and the third circle has a greater diameter than the second circle and the fourth circle has a diameter greater than the third circle;

arranging a number W of signal points along the first circle where W is an even number;

arranging a number X of signal points along the second circle where X is an even number greater than W;

arranging a number Y of signal points along the third circle where Y is an even number greater than X;

arranging a number Z of signal points alone the fourth circle where Z is an even number greater than Y;

grouping all of the signal points on the first circle and some of the signal points on the second circle into first sets of four signal points where each of the first sets includes two adjacent signal points from each of the first and second circles;

grouping some of the signal points on the second circle and some of the signal points on the third circle into second sets of four signal points where each of the second sets includes two adjacent signal points from each of the second and third circles;

grouping some of the signal points on the third circle and some of the signal points on the fourth circle into third sets of four signal points where each of the third sets includes two adjacent signal points from each of the third and fourth circles;

grouping some of the signal points on the fourth circle into fourth sets of four signal points where each of the fourth sets includes four adjacent signal points on the fourth circle and;

each of the sets adapted to represent a two bit binary number based on which signal point of the four signal points in each set is transmitted.

17. The method according to claim 16 wherein the fourth circle has twenty-four points, the third circle has twenty points, the second circle has twelve points and the first circle has eight points.

* * * * *